(12) United States Patent
O'Brien (10) Patent No.: US 6,401,536 B1
(45) Date of Patent: Jun. 11, 2002

(54) ACCELERATION SENSOR AND METHOD OF MANUFACTURE

(75) Inventor: Gary J. O'Brien, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/502,806

(22) Filed: Feb. 11, 2000

(51) Int. Cl.[7] .............................................. G01P 15/08
(52) U.S. Cl. .................................. 73/514.38; 73/514.11
(58) Field of Search ........................ 73/514.02, 514.01, 73/514.15, 514.29, 514.32, 504.02, 504.04, 504.08, 504.09, 504.12, 504.13, 514.16, 514.38

(56) References Cited

U.S. PATENT DOCUMENTS

| 5,233,213 A | 8/1993 | Marek | |
|---|---|---|---|
| 5,329,815 A | 7/1994 | Dunn et al. | .................... 73/505 |
| 5,359,893 A | 11/1994 | Dunn | ........................... 73/505 |
| 5,377,544 A | 1/1995 | Dunn | ........................... 73/505 |
| 5,450,751 A | 9/1995 | Putty et al. | ............... 73/504.18 |
| 5,555,765 A * | 9/1996 | Greiff | ....................... 73/504.09 |
| 5,806,365 A | 9/1998 | Zunino et al. | ........... 73/514.16 |
| 5,872,313 A | 2/1999 | Zarabadi et al. | .............. 73/497 |
| 5,955,668 A * | 9/1999 | Hsu et al. | ................. 73/504.12 |
| 6,076,401 A * | 6/2000 | Okada | ...................... 73/504.12 |

* cited by examiner

Primary Examiner—Helen Kwok (57) ABSTRACT

An acceleration sensor includes a substrate (101), a proof mass (110, 210) over the substrate and having first and second attachment regions (113, 114, 213, 214), and an anchor structure (120, 221, 222) coupled to the substrate. The sensor additionally includes a first suspension beam (130, 230) coupling the anchor structure to the first attachment region to suspend the proof mass over the substrate. The sensor further includes a second suspension beam (140, 240) coupling the anchor structure to the second attachment region to suspend the proof mass over the substrate. The first suspension beam has a first radius (311, 321) extending from the anchor structure to the first attachment region, and the second suspension beam has a second radius (312, 322) extending from the anchor structure to the second attachment region where the first radius is greater than the second radius.

29 Claims, 4 Drawing Sheets

ACCELERATION SENSOR AND METHOD OF MANUFACTURE

FIELD OF THE INVENTION

This invention relates, in general, to transducers, and more particularly, to acceleration sensors.

BACKGROUND OF THE INVENTION

Acceleration sensors such as yaw rate sensors are used to measure angular acceleration. A yaw rate sensor includes a proof mass suspended over a surface of a support substrate. The proof mass rotates around a z-axis in response to an acceleration force where the z-axis is perpendicular to the surface of the support substrate. The motion sensitivity of the proof mass around the z-axis is referred to as the theta-rotation sensitivity, which is a function of the theta-rotation spring constant. The proof mass also has a motion sensitivity along the z-axis, which is a function of the z-axis spring constant.

Yaw rate sensors should have a high z-axis spring constant and a low theta-rotation constant in order to reduce the motion sensitivity along the z-axis while maintaining a high theta-rotation sensitivity. One technique to increase the z-axis spring constant involves increasing the thickness of the support beams suspending the proof mass over the substrate while maintaining the width of the support beams. However, increasing the thickness of the suspension beams also undesirably increases the theta-rotation spring constant by a similar amount.

Accordingly, a need exists for an acceleration sensor having a low theta-rotation spring constant and a high z-axis spring constant.

BRIEF DESCRIPTION OF THE DRAWINGS

The present invention will be better understood from a reading of the following detailed description, taken in conjunction with the accompanying drawing figures in which:

FIG. 6 illustrates a second embodiment of an anchor structure according to the invention; and For simplicity and clarity of illustration, the drawing figures illustrate the general manner of construction, and elements in the drawing figures are not necessarily drawn to scale. Additionally, the same reference numerals in different figures denote the same elements, and descriptions and details of well-known features and techniques are omitted to avoid unnecessarily obscuring the present invention. Furthermore, the terms left, right, front, back, top, bottom, over, under, and the like in the description and in the claims, if any, are used for descriptive purposes. However, it is understood that the embodiment of the invention described herein is capable of operation in other orientations than described or illustrated herein. It is further understood that the terms so used are for the purposes of describing relative positions and are interchangeable under appropriate circumstances.

DETAILED DESCRIPTION OF THE DRAWINGS

Figure 1:
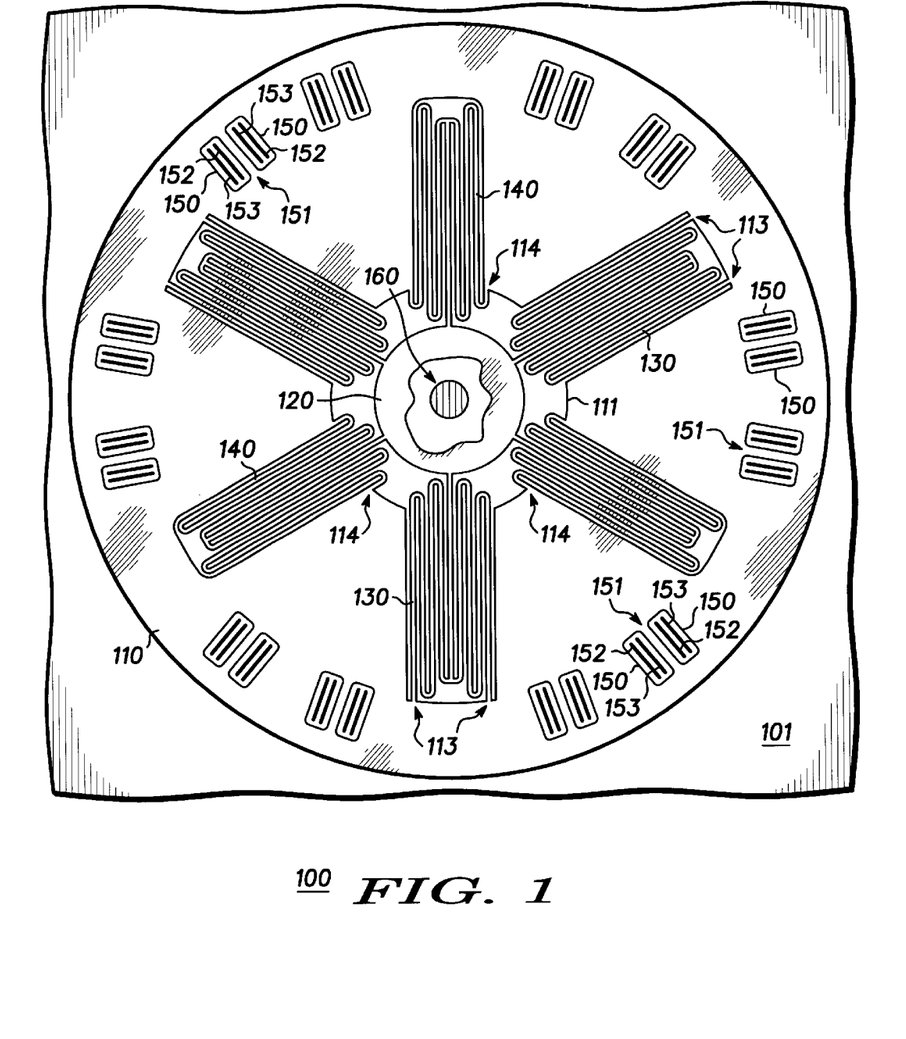
FIG. 1 illustrates an embodiment of an acceleration sensor in accordance with the present invention.

FIG. 1 illustrates a top view of an acceleration sensor 100. In the preferred embodiment, sensor 100 is a yaw rate sensor measuring angular acceleration. Sensor 100 includes, among other features, a support substrate 101 and a proof mass 110 suspended over a surface of substrate 101. In the preferred embodiment, substrate 101 is comprised of at least one dielectric layer over a semiconductor substrate.

In the preferred embodiment, proof mass 110 has a round or circular shape to provide even or uniform distribution of weight across proof mass 110. Proof mass 110 includes a hole 111 and a plurality of attachment regions 113 and 114 around a perimeter of hole 111. Regions 113 and 114 are discussed in more detail hereinafter.

Sensor 100 also includes an anchor structure 120, a first plurality of suspension beams 130, and a second plurality of suspension beams 140. Anchor structure 120 is located within hole 111 of proof mass 110, and anchor structure 120 is coupled to substrate 101. Suspension beams 130 are also located within hole 111 of proof mass 110, and each of suspension beams 130 couples a different one of attachment points 113 to anchor structure 120. Similarly, suspension beams 140 are also located within hole 111 of proof mass 110, and each of suspension beams 140 couple a different one of attachment points 114 to anchor structure 120. In this configuration, suspension beams 130 and 140 suspend proof mass 110 over the surface of substrate 101. Furthermore, each of suspension beams 130 are located between different pairs of adjacent ones of suspension beams 140, and each of suspension beams 140 are located between different pairs of adjacent ones of suspension beams 130. In the preferred embodiment, each of suspension beams 130 and 140 are coupled to two different attachment regions.

Also in the preferred embodiment, substrate 101 is comprised of silicon, and proof mass 110, anchor structure 120, and suspension beams 130 and 140 are all comprised of doped polysilicon. Further in the preferred embodiment, proof mass 130, anchor structure 120, and suspension beams 130 and 140 are fabricated using surface micromachining techniques known in the art. However, alternatively, single crystal techniques or a combination of single crystal techniques and surface micromachining techniques can be used to fabricate proof mass 130, anchor structure 120, and suspension beams 130 and 140.

Sensor 100 has a z-axis around which proof mass 110 rotates. In FIG. 1, the z-axis of sensor 100 extends perpendicularly from the surface of substrate 101 and extends through a region or point 160, which is preferably the center of mass and geometric center of proof mass 110. In operation, proof mass 110 is rotatable around point 160 in response to an acceleration force having a vector component substantially parallel to the surface of substrate 101.

The angular acceleration detected by sensor 100 is preferably measured by using a differential capacitance, which is measured by the following features in sensor 100. Proof mass 110 includes a plurality of pairs of holes 150, where each of the pairs of holes 150 are separated by a portion 151 of proof mass 110. Electrodes 152 and 153 are located within each of holes 150. In one embodiment, proof mass 110, electrode 152 and electrode 153 are each biased to a different voltage potential. However, in a different embodiment, proof mass 110 is biased to a first voltage, and electrodes 152 and 153 are biased to a second voltage. In operation, as proof mass 110 rotates clockwise or counter-clockwise in response to an acceleration force, portion 151 of proof mass 110 moves towards electrode 153 or towards electrode 152, respectively, and external circuitry (not shown) can determine the direction and magnitude of the acceleration force.

Figure 2:
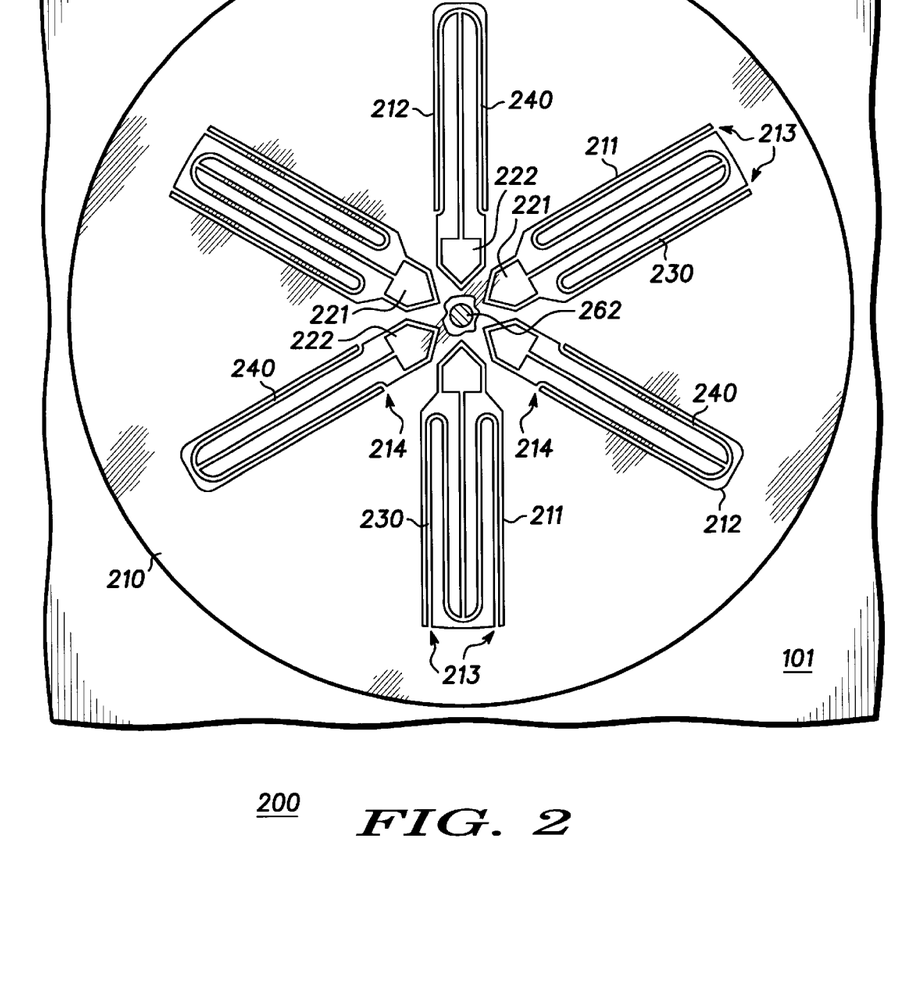
FIG. 2 illustrates a top view of a different embodiment of an acceleration sensor in accordance with the present invention.

FIG. 2 illustrates a top view of an acceleration sensor 200, which is a different embodiment than sensor 100 in FIG. 1. Similar to sensor 100 in FIG. 1, sensor 200 in FIG. 2 is also preferably a yaw rate sensor measuring angular acceleration. In an attempt to simplify FIG. 2, sensor 200 is not illustrated to include differential capacitance structures for measuring the magnitude and direction of the angular acceleration. However, one skilled in the art will understand that sensor 200 does include such features, which are similar to features 150 through 153 illustrated in FIG. 1.

Sensor 200 includes a proof mass 210 over the surface of substrate 101. Proof mass 210 includes a first plurality of holes 211 and a second plurality of holes 212. Proof mass 210 also includes a first plurality of attachment regions 213 located at a perimeter of holes 211 and a second plurality of attachment regions 214 located at a perimeter of holes 212. In the preferred embodiment, each of holes 211 and 212 are of equal size, and each have two attachment regions around their respective perimeters.

Sensor 200 also includes an anchor structure to which proof mass 210 is coupled. In the preferred embodiment, the anchor structure of sensor 200 includes a first plurality of anchors 221 and a second plurality of anchors 222 coupled to the surface of substrate 101. Sensor 200 also includes a first plurality of suspension beams 230 coupling a different one of the first plurality of anchors 221 to a different one of the first plurality of attachment regions 213. Sensor 200 further includes a second plurality of suspension beams 240 coupling a different one of the second plurality of anchors 222 to a different one of the second plurality of attachment region 214. Suspension beams 230 and 240 suspend proof mass 210 over the surface of substrate 101. In the preferred embodiment, each of suspension beams 230 are located between different pairs of adjacent ones of suspension beams 240, and each of suspension beams 240 are located between different pairs of adjacent ones of suspension beams 230. Furthermore, in the preferred embodiment, each of holes 211 in proof mass 210 contain a different one of suspension beams 230 and a different one of anchors 221 where the particular suspension beam in the hole is coupled to the particular anchor in the same hole and where the particular suspension beam in the hole is also coupled to a different one of the attachment points 213 at a perimeter of the same hole 211. Similarly, each of holes 212 in proof mass 210 include a different one of suspension beams 240 and a different one of anchors 222 where the particular suspension beam in the hole is coupled to the particular anchor in the same hole and where the particular suspension beam in the hole is also coupled to a different one of attachment points 214 at a perimeter of the same hole.

Similar to sensor 100 in FIG. 1, sensor 200 has a z-axis around which proof mass 210 rotates. In FIG. 2, the z-axis of sensor 200 extends perpendicularly from the surface of substrate 101 and extends through a region or point 260, which is preferably the center of mass and geometric center of proof mass 110. In operation, proof mass 210 is rotatable around point 260 in response to an acceleration force having a vector component substantially parallel to the surface of substrate 101. In the preferred embodiment, the z-axis and point 260 in sensor 200 are located between the first plurality of anchors 221 and the second plurality of anchors 222.

One difference between sensor 200 in FIG. 2 and sensor 100 in FIG. 1 is that a portion of proof mass 210 of sensor 200 is located at point 260 while a portion of proof mass 110 of sensor 100 is not located at point 160. This particular configuration of sensor 200 provides a more rigid proof mass that is more stable, has an improved temperature expansion coefficient, and has greater theta-rotation efficiency compared to proof mass 110 in FIG. 1. Optionally, an anchor structure 262 may be located at point 260 and may be used as a torsional spring or stud as illustrated in FIG. 2.

Figure 3:
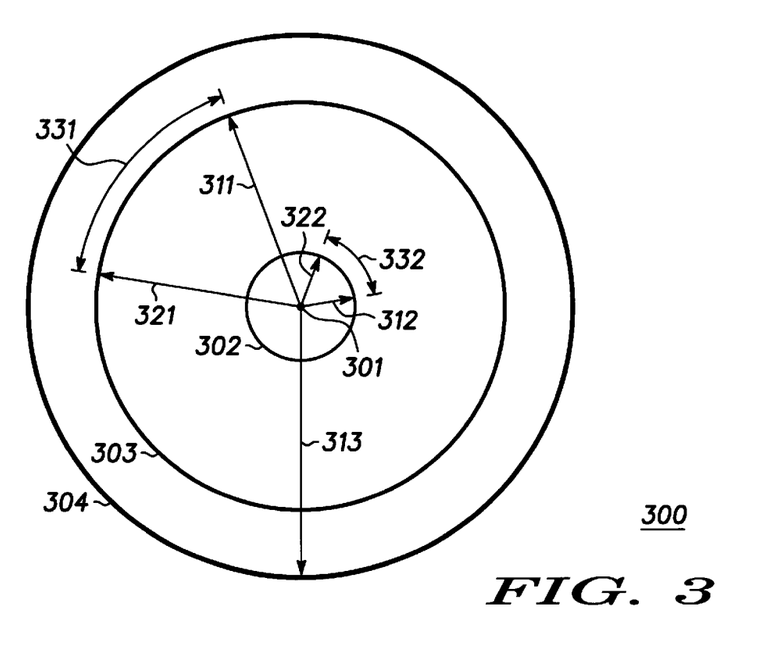
FIG. 3 illustrates a top view of a third embodiment of an acceleration sensor in accordance with the present invention.

FIG. 3 illustrates a schematic view of an acceleration sensor 300 that represents both of acceleration sensors 100 and 200. A region or point 301 represents points 160 and 260 in FIGS. 1 and 2, respectively. Similarly, concentric rings 302, 303, and 304 represent the locations of attachment points 114, the locations of attachment points 113, and the outer perimeter of proof mass 110, respectively, in FIG. 1 and also represent the locations of attachment points 214, the location of attachment points 213, and the outer perimeter of proof mass 210, respectively, in FIG. 2. Vectors 311 and 321 extending from point 301 to ring 303 represent a first plurality of lengths or radii of suspension beams 130 (FIG. 1) and 230 (FIG. 2). Vectors 312 and 322 extending from point 301 to ring 302 represent a second plurality of lengths or radii of suspension beams 140 (FIG. 1) and suspension beams 240 (FIG. 2). A vector 313 extending from point 301 to ring 304 represents a radius or length of proof mass 110 (FIG. 1) and 210 (FIG. 2). Vectors 311 and 321 are greater than vectors 312 and 322. In one embodiment, vectors 311, 312, 321, and 322 are measured only from the anchor structures in FIGS. 1 and 2 to the attachment points in FIGS. 1 and 2. However, in the preferred embodiment, vectors 311, 312, 321, and 322 are not only measured from the anchor structures in FIGS. 1 and 2, but also extend through the anchor structures in FIGS. 1 and 2 to points 160 and 260 in FIGS. 1 and 2. Furthermore, the lengths or radii of the suspension beams in sensors 100 (FIG. 1) and 200 (FIG. 2) are preferably measured in a straight or direct line, instead of along the actual serpentine configuration of the suspension beams. Additionally, vectors 311, 312, 313, 321, and 332 form a plane to which the z-axes of sensors 100 (FIG. 1) and 200 (FIG. 2) are perpendicular.

A distance 331 around ring 303 represents a linear distance between vectors 311 and 321, and the angle between vectors 311 and 321 is characterized by an angle $\theta_1$. Similarly, a distance 332 around ring 302 represents a linear distance between vectors 312 and 322, and the angle between vectors 312 and 322 is characterized by an angle $\theta_2$.

To facilitate the calculation of a theta-rotation spring constant, the angular motion of the sensor is converted to a linear motion, as illustrated by Equations 1 and 2:

$$\theta_1 X_1 / R_1 \quad \text{Equation 1}$$

$$\theta_2 = X_2 / R_2 \quad \text{Equation 2}$$

where $X_1$ is distance 332, $R_1$ is the magnitude of vector 312 or 322, $X_2$ is distance 331, and $R_2$ is the magnitude of vector 311 or 321. Assuming that $\theta_1$ equals $\theta_2$, Equation 3 is derived from Equations 1 and 2:

$$X_1 = X_2 (R_1 / R_2). \quad \text{Equation 3}$$

Equation 4 shows Equation 3 substituted into an equation for the total potential energy (P.E.) of a portion of the sensor:

$$P.E. = (1/2)[(k_1)(X_2/(R_1/R_2)^2) + k_2(X_2)^2] \qquad \text{Equation 4}$$

$$= (1/2)[(k_1)(R_1/R_2)^2 + k_2](X_2)^2$$

where $k_1$ is the spring constant for suspension beams 130 (FIG. 1) or 230 (FIG. 2), and $k_2$ is the spring constant for suspension beams 140 (FIG. 1) or 240 (FIG. 2). In the preferred embodiment, k equals approximately 0.4 Newtons per meter (N/m) to 10.0 N/m. Equation 5 shows the kinetic energy (Keq) of the same portion of the sensor:

$$Keq = (k_1)(R_1/R_2)^2 + k_2 \qquad \text{Equation 5}$$

Equations 4 and 5 represent the potential energy and kinetic energy, respectively, of only one of suspension beams 130 (FIG. 1) or 230 (FIG. 2) and only one of suspension beams 140 (FIG. 1) or 240 (FIG. 2), where the width of each suspension beam is the same and equals the thickness of each suspension beam. The preferred embodiment, for a non-resonant sensor, is the width and thickness of each suspension beam are preferably of different values which are non integer multiples such as 2 micrometers wide by 3.5 micrometers thick. However, sensors 100 and 200 each have three of both types of suspension beams.

Equation 6 takes into account all six suspension beams and represents the total kinetic energy of the sensor. One skilled in the art will understand that Equation 6 is derived from the fact that the radii are in parallel with each other under a linear motion analysis. To simplify the calculation in Equation 6, it is assumed that $k_1$ is approximately equal to $k_2$.

$$Keq = 3k[1 + (R_1/R_2)^2] \qquad \text{Equation 6}$$

In one embodiment of sensors 100 or 200, $R_1$ and $R_2$ are equal to approximately 40 micrometers and 160 micrometers, respectively. Equation 7 represents the total kinetic energy of sensors 100 or 200 with the aforementioned radii.

$$Keq = 3k(1 + 0.0625) \qquad \text{Equation 7}$$

Equation 7 also represents a theta-rotation spring constant for sensors 100 or 200 having the aforementioned radii. One skilled in the art will understand that Equation 7 shows that the theta-rotation spring constant can be relatively insensitive to the length $R_1$ of the radii. In particular, for the aforementioned radii, the theta-rotation spring constant is only increased by approximately 6.25%.

For the z-axis spring constant, Equations 8 and 9 represent the total kinetic energy along the z-axis for sensors 100 and 200.

$$Keq = \Sigma k_1 + \Sigma k_2 \qquad \text{Equation 8}$$

$$Keq = 3k_1 + 3k_2 \qquad \text{Equation 9}$$

Again, assuming that $k_1$ is approximately equal to $k_2$:

$$Keq = 6k \qquad \text{Equation 10}$$

Equation 10 represents the z-axis spring constant, and one skilled in the art will understand that the z-axis spring constant is independent of the radii of sensors 100 or 200. Furthermore, examining Equations 6 and 10 in combination, one skilled in the art will understand that the z-axis spring constant is approximately two times greater than the theta-rotation spring constant. As indicated earlier, Equations 7 and 10 are based on the design consideration where the width of each suspension beam is the same and equals the thickness of each suspension beam. However, if the thickness of each suspension beam is greater than the width of each suspension beam, then one skilled in the art will understand that the z-axis spring constant will be greater than two times the theta-rotation spring constant. Furthermore, by adjusting the ratios of the two radii in sensors 100 or 200, one skilled in the art will understand that the theta-rotation spring constant can be increased or decreased independently of the z-axis spring constant.

In sensor 200, another technique to increase the z-axis spring constant over the theta-rotation spring constant is to use an, additional anchor structure 262 that may be that may be optionally present in the invention, at point 260 of proof mass 210 as illustrated in FIG. 2. This optional, additional anchor structure 262 can be used in sensor 200 when proof mass 210 is designed to rotate around the z-axis less than approximately one degree. Due to its location, this additional anchor structure operates as a torsional spring or stud during the rotation of proof mass 210. This additional anchor structure 262 provides a small increase in the theta-rotation spring constant for sensor 200 while simultaneously providing a large increase in the z-axis spring constant for sensor 200. The magnitude of increase for the theta-rotation spring constant can be lowered by reducing the cross sectional surface area of the additional anchor structure.

Figure 5:
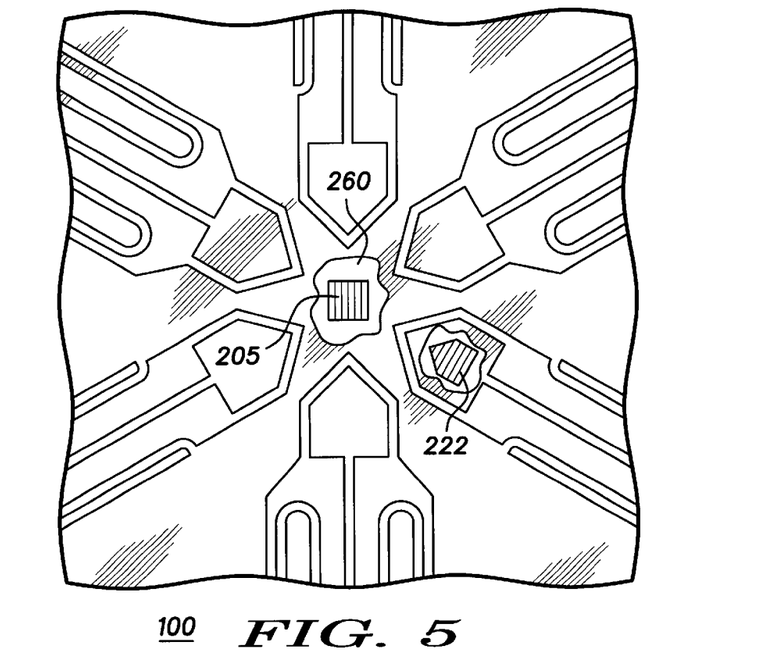
FIG. 5 illustrates a highly simplified view of yet another embodiment of an acceleration sensor in accordance with the present invention.
Figure 6:
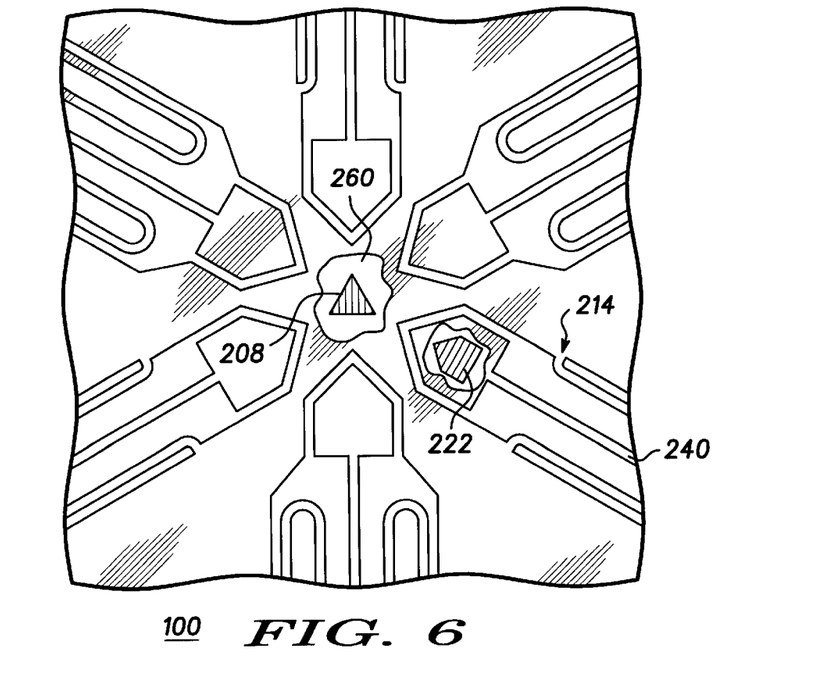

For example, as illustrated in FIGS. 2 and 5 an additional anchor structure 205 having a square perimeter with four equal sides, each with a fixed length of X, will increase the theta-rotation spring constant by a larger amount than an anchor structure 262 having a circular perimeter with a diameter of the fixed length of X. As illustrated in FIG. 6, an additional anchor structure 208 having a triangular perimeter with three equal sides of length X will decrease the theta-rotation spring constant by a lesser amount than an anchor structure 262 having a circular perimeter with a diameter of the fixed length of X.

In addition to providing independent theta-rotation and z-axis spring constants, sensors 100 and 200 also provide independently tunable z-axis and theta-rotation resonant frequencies. Equation 11 illustrates the theta-rotation resonant frequency ($\overline{\omega}_{n\Theta}$):

$$\overline{\omega}_{n\Theta} \cong \sqrt{\frac{6*k}{M} * \frac{(R_1^2 + R_2^2)}{R^2}} \qquad \text{Equation 11}$$

Where R is the magnitude of vector 313 in FIG. 3, Equation 12 illustrates the z-axis resonant frequency ($\overline{\omega}_{nz}$):

$$\overline{\omega}_{nz} \cong \sqrt{\frac{6*k}{M}} \qquad \text{Equation 12}$$

In Equations 11 and 12, k represents the spring constant for the suspension beams, and M represents the total mass of the seismic mass and suspension beams. In the preferred embodiment, M equals approximately $2.13 \times 10^{-9}$ kilograms. Equations 11 and 12 have been simplified by assuming that the spring constant for both radii are the same. Examining Equations 11 and 12, one skilled in the art will understand that the z-axis resonant frequency can be tuned by adjusting either the spring constant k or the mass of the system while the theta-resonant frequency can be independently tuned by adjusting the radii of the suspension beams. In the preferred embodiment, the resonant frequencies for the z-axis and theta-rotation are preferably set to non-integer multiples of each other such that harmonics along the z-axis and the theta-resonance do not overlap or do not constructively interfere with each other.

Figure 4:
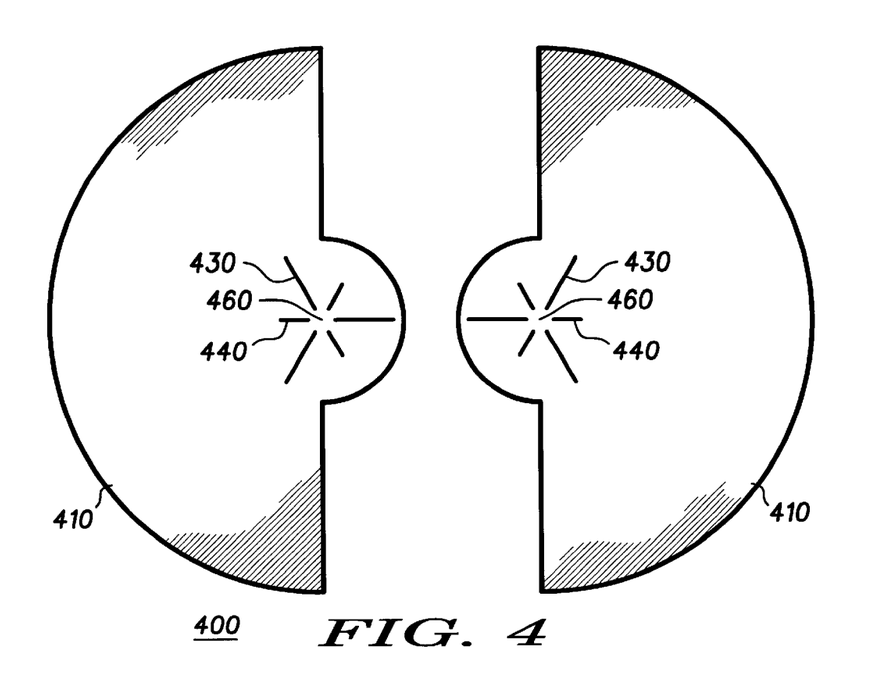
FIG. 4 illustrates a schematic view of the acceleration sensors of FIGS. 1 and 2 in accordance with the present invention.

FIG. 4 illustrates a highly simplified view of an acceleration sensor 400. In the preferred embodiment, sensor 400 is a linear acceleration sensor that measures acceleration along x-axis 421. In an attempt to further simplify FIG. 4, sensor 400 is not illustrated to include differential capacitance structures for measuring the magnitude and direction of the linear acceleration. However, one skilled in the art will understand that sensor 400 does include such features, which are similar to features 150 through 153 illustrated in FIG. 1.

Sensor 400 includes a proof mass 410 split into two separate halves. Although not illustrated in FIG. 4, each half of proof mass 410 preferably includes two sets of holes, and sensor 400 also preferably includes an anchor structure having two sets of anchors. The two sets of holes in proof mass 410 are similar to holes 211 and 212 in FIG. 2, and the two sets of anchors are similar to anchors 221 and 222 in FIG. 2.

In the preferred embodiment, each half of sensor 400 includes three long suspension beams 430 and three short suspension beams 440. Suspension beams 430 can be similar to either of suspension beams 130 (FIG. 1) or 230 (FIG. 2), and suspension beams 440 can be similar to suspension beams 140 (FIG. 1) or 240 (FIG. 2). The left half of proof mass 410 rotates around a region or point 460, and the right half of proof mass 410 rotates around a region or point 461. In response to an acceleration force in the positive direction along x-axis 421, the left half of proof mass 410 rotates in a counter-clockwise direction around point 460, and the right half of proof mass 410 rotates in a clockwise direction around point 461. In response to an acceleration force in the negative direction along x-axis 421, the left half of proof mass 410 rotates in a clockwise direction around point 460, and the right half of proof mass 410 rotates in a counter-clockwise direction around point 461.

Therefore, an improved acceleration sensor is provided to overcome the disadvantages of the prior art. The acceleration sensor disclosed herein has a low theta-rotation spring constant and a high z-axis spring constant.

While the present invention has been particularly shown and described with reference to specific embodiments, it will be understood by those skilled in the art that various changes may be made to the embodiments herein without departing from the spirit or scope of the present invention. For instance, the numerous details set forth herein such as, for example, the material compositions and the number of bends in each suspension beam are provided to facilitate the understanding of the present invention and are not provided to limit the scope of the present invention. Furthermore, the dual radii concept can also be applied to Coriolis sensors that operate at resonance. Additionally, the separate halves of sensor 400 in FIG. 4 can be offset from each other, and each half of sensor 400 may include only two long suspension beams 430 and three short suspension beams 440 such that the two halves of sensor 400 can be located closer to each other. Moreover, the sensors of FIGS. 1 or 2 can be split into thirds, quarters, fifths, or the like. Accordingly, the disclosure of embodiments of the present invention is intended to be illustrative of the scope of the present invention and is not intended to be limiting. It is intended that the scope of the present invention shall be limited only to the extent required by the appended claims.

What is claimed is:

1. An acceleration sensor comprising:

a substrate;

a proof mass over the substrate and having first and second attachment regions;

an anchor structure over and coupled to the substrate;

a first suspension beam over the substrate and coupling the anchor structure to the first attachment region of the proof mass to suspend the proof mass over the substrate; and a second suspension beam over the substrate and coupling the anchor structure to the second attachment region of the proof mass to suspend the proof mass over the substrate, wherein:

the first suspension beam has a first length extending from the anchor structure to the first attachment region;

the second suspension beam has a second length extending from the anchor structure to the second attachment region; and the first length is greater than the second length.

2. The acceleration sensor of claim 1 wherein:

the first and second lengths are measured from a common point, through the anchor structure, and to respective ones of the first and second attachment regions.

3. The acceleration sensor of claim 2 wherein:

the common point is located at a geometric center of the proof mass.

4. The acceleration sensor of claim 2 wherein:

the first and second lengths form a plane; and the proof mass is rotatable around the common point in response to an acceleration force having a vector component substantially parallel to the plane.

5. The acceleration sensor of claim 4 wherein:

the acceleration sensor has a z-axis around which the proof mass rotates;

the z-axis extends through the common point and is perpendicular to the plane;

the first and second suspension beams have a theta spring constant around the z-axis and a z-axis spring constant along the z-axis; and the z-axis spring constant is at least approximately two times greater than the theta spring constant.

6. The acceleration sensor of claim 1 wherein:

the acceleration sensor has a z-axis around which the proof mass rotates;

the proof mass has a z-axis resonant frequency along the z-axis and a theta-rotation resonant frequency around the z-axis; and the theta-rotation resonant frequency is independently tunable from the z-axis resonant frequency.

7. The acceleration sensor of claim 1 wherein:

the proof mass has first and second holes;

the first attachment region is located at a perimeter of the first hole;

the second attachment region is located at a perimeter of the second hole;

the anchor structure includes a first anchor and a second anchor;

the first anchor and the first suspension beam are located in the first hole;

the second anchor and the second suspension beam are located in the second hole;

the first suspension beam couples the first attachment region of the proof mass to the first anchor; and the second suspension beam couples the second attachment region of the proof mass to the second anchor.

8. The acceleration sensor of claim 7 wherein:

a size of the first hole and a size of the second hole are equal to each other.

9. The acceleration sensor of claim 7 wherein:

the proof mass is rotatable around an axis.

10. The acceleration sensor of claim 9 wherein:

a first radius and a second radius are measured from the axis to respective ones of the first and second attachment regions, wherein the first radius is greater than the second radius.

11. The acceleration sensor of claim 9 wherein:

the axis passes through a portion of the proof mass.

12. The acceleration sensor of claim 9 wherein:

the axis is located between the first and second anchors.

13. The acceleration sensor of claim 7 further comprising:

a second anchor structure located over the substrate, coupled to the substrate, coupled to the proof mass, located between the first and second holes of the proof mass, and located between the first and second anchors.

14. The acceleration sensor of claim 13 wherein the second anchor structure comprises a torsional spring having at least one suspension beam connected to the proof mass at least one length of the spring.

15. The acceleration sensor of claim 14 wherein the torsional spring has at least one suspension beam structure having a theta spring constant around a z-axis.

16. The acceleration sensor of claim 1 wherein:

the proof mass has a hole;

the anchor structure and the first and second suspension beams are located in the hole; and the first and second attachment regions are located at a perimeter of the hole.

17. The acceleration sensor of claim 1 wherein:

the proof mass is rotatable around an axis.

18. The acceleration sensor of claim 1 further comprising:

a second proof mass over the substrate and having third and fourth attachment regions;

a second anchor structure over and coupled to the substrate;

a third suspension beam over the substrate and coupling the second anchor structure to the third attachment region of the second proof mass to suspend the second proof mass over the substrate; and a fourth suspension beam over the substrate and coupling the second anchor structure to the fourth attachment region of the second proof mass to suspend the second proof mass over the substrate, wherein:

the third suspension beam has the first length extending from the second anchor structure to the third attachment region;

the fourth suspension beam has the second length extending from the second anchor structure to the fourth attachment region;

the first and second anchor structures are adjacent to each other; and the first and second proof masses are absent between the first and second anchor structures.

19. An acceleration sensor comprising:

a support substrate having a surface;

a round proof mass located over the surface of the support substrate and having a first plurality of holes, a second plurality of holes, a first plurality of attachment regions at perimeters of the first plurality of holes, and a second plurality of attachment regions at perimeters of the second plurality of holes;

a first plurality of anchors over and coupled to the surface of the support substrate, each of the first plurality of anchors located in a different one of the first plurality of holes in the round proof mass;

a second plurality of anchors over and coupled to the surface of the support substrate, each of the second plurality of anchors located in a different one of the second plurality of holes in the round proof mass;

a first plurality of suspension beams over the surface of the substrate and suspending the round proof mass over the surface of the support substrate, each of the first plurality of suspension beams located in a different one of the first plurality of holes in the round proof mass and coupling a different one of the first plurality of anchors to a different one of the first plurality of attachment regions; and a second plurality of suspension beams over the surface of the substrate and suspending the round proof mass over the surface of the support substrate, each of the second plurality of suspension beams located in a different one of the second plurality of holes in the round proof mass and coupling a different one of the second plurality of anchors to a different one of the second plurality of attachment regions, wherein:

each of the first plurality of suspension beams has a first radius extending from the different one of the first plurality of anchors to the different one of the first plurality of attachment regions;

each of the second plurality of suspension beams has a second radius extending from the different one of the second plurality of anchors to the different one of the second plurality of attachment regions; and the first radius is greater than the second radius.

20. The acceleration sensor of claim 19 wherein:

each of the first plurality of suspension beams are located between different pairs of adjacent ones of the second plurality of suspension beams; and each of the second plurality of suspension beams are located between different pairs of adjacent ones of the first plurality of suspension beams.

21. The acceleration sensor of claim 20 wherein:

each of the first plurality of holes has one of the first plurality of anchors and one of the first plurality of suspension beams;

the support substrate is comprised of silicon; and the round proof mass, the first and second plurality of anchors, and the first and second plurality of suspension beams are comprised of doped polysilicon.

22. The acceleration sensor of claim 20 wherein:

the first and second plurality of holes are of equal size.

23. The acceleration sensor of claim 20 wherein:

the acceleration sensor has a z-axis around which the round proof mass rotates;

the first and second radii form a plane;

the z-axis is perpendicular to the plane;

the first and second suspension beams have a theta spring constant around the z-axis and a z-axis spring constant along the z-axis; and the z-axis spring constant is at least approximately two times greater than the theta-rotation spring constant.

24. The acceleration sensor of claim 20 wherein:

the round proof mass has a z-axis resonant frequency along the z-axis and a theta-rotation resonant frequency around the z-axis; and the theta-rotation resonant frequency is independently tunable from the z-axis resonant frequency.

25. The acceleration sensor of claim 20 wherein:

the first and second radii are measured from a common point.

26. The acceleration sensor of claim 25 wherein:

the round proof mass is rotatable around the common point in response to an acceleration force having a vector component substantially parallel to the surface of the support substrate.

27. The acceleration sensor of claim 26 wherein:

the round proof mass is located at the common point.

28. The acceleration sensor of claim 27 wherein:

the common point is located at a geometric center of the round proof mass.

29. A method of manufacturing an acceleration sensor comprising:

providing a substrate;

forming a proof mass over the substrate and having first and second attachment regions;

forming an anchor structure over and coupled to the substrate;

forming a first suspension beam over the substrate and coupling the anchor structure to the first attachment region of the proof mass to suspend the proof mass over the substrate; and forming a second suspension beam over the substrate and coupling the anchor structure to the second attachment region of the proof mass to suspend the proof mass over the substrate, wherein:

the first suspension beam has a first length extending from the anchor structure to the first attachment region;

the second suspension beam has a second length extending from the anchor structure to the second attachment region; and the first length is greater than the second length.

\* \* \* \* \*